United States Patent [19]

Ishigaki et al.

[11] 4,242,608
[45] Dec. 30, 1980

[54] MOTOR USING HALL EFFECT ELEMENTS

[75] Inventors: Yasuhiro Ishigaki; Toshio Sugiyama, both of Toyokawa, Japan

[73] Assignee: Hitachi, Ltd., Japan

[21] Appl. No.: 927,393

[22] Filed: Jul. 24, 1978

[30] Foreign Application Priority Data

Jul. 25, 1977 [JP] Japan ............................. 52/88412

[51] Int. Cl.$^3$ ............................................. H02K 11/00
[52] U.S. Cl. ................................ 310/68 R; 310/68 B; 310/268; 318/254
[58] Field of Search ................... 310/48, 68 R, 68 C, 310/268; 318/254, 138, 254 A

[56] References Cited

U.S. PATENT DOCUMENTS

| | | | |
|---|---|---|---|
| 3,644,765 | 2/1972 | Janson | 310/68 |
| 3,867,656 | 2/1975 | Mitsui et al. | 310/68 |
| 3,912,956 | 10/1975 | Müller | 310/268 X |
| 4,011,475 | 3/1977 | Schmider | 310/68 R |
| 4,115,715 | 9/1978 | Müller | 310/68 B |
| 4,174,484 | 11/1979 | Schmider | 310/68 R |

Primary Examiner—Donovan F. Duggan
Attorney, Agent, or Firm—Craig & Antonelli

[57] ABSTRACT

A motor using Hall effect elements is disclosed, in which a disk-shaped multi-pole magnet which is circumferentially divided into a plurality of magnetic poles each magnetized in an opposite polarity to its adjacent magnetic poles is attached to a rotary shaft and a magnetic circuit is constituted by the multi-pole magnet and a yoke plate disposed to face the multi-pole magnet. A pair of Hall effect elements are disposed within a magnetic field of the multi-pole magnet to detect positions of the respective magnetic poles of the multi-pole magnet. Output voltages from the pair of Hall effect elements are supplied to a pair of drive coils, respectively, to generate driving magnetic fluxes therein. A pair of pole pieces are mounted on the yoke plate to face the pair of Hall effect elements, respectively. The pair of pole pieces are axially movable to allow adjustment of spacings between the respective pole pieces and respective Hall effect elements so that magnetic flux densities supplied to the pair of Hall effect elements can be adjusted.

10 Claims, 4 Drawing Figures

MOTOR USING HALL EFFECT ELEMENTS

BACKGROUND OF THE INVENTION

The present invention relates to a motor using Hall effect elements, and more particularly to a brushless motor housing a multi-pole magnet as a rotor and Hall effect elements for detecting positions of magnetic poles of the rotor magnet to switch polarities of currents supplied to stator coils.

In a disk record player for playing back a disk record and magnetic tape recorder and player for recording and reproducing a signal on a magnetic tape, it is desirable to use a brushless motor in order to minimize vibration and noise. The brushless motor is particularly advisable for the motor used in the disk record player in which a rotary shaft of the motor is directly coupled to a rotary shaft of a turn table to directly drive the turn table, because the vibration of the motor is directly transmitted to the turn table. A motor which uses a multi-pole magnet as a rotor and in which the positions of magnetic poles are detected by Hall effect elements to switch the polarities of currents supplied to drive coils has been known. In one example of this type of motor, a disk-shaped multi-pole magnet is attached to a rotary shaft of the motor, which disk-shaped magnet is circumferentially divided into a plurality of magnetic poles each magnetized in the direction of thickness thereof in an opposite polarity to its adjacent magnetic poles. A pair of drive coils are disposed to face the disk-shaped magnet. Each of the pair of drive coils is wound in star-shape and has drive portions which extend outward and generally radially from the center of a rotating axis. The pair of coils are angularly displaced from each other by an electrical angle of 90°. A pair of Hall effect elements are disposed within a magnetic field of the disk-shaped magnet and angularly displaced from each other by an electrical angle of 90°. The motor has an axially extending magnetic air gap, and the pair of Hall effect elements detect the polarities of magnet poles of the disk-shaped magnet located on the respective Hall effect elements, and these output signals from the respective Hall effect elements are supplied to the pair of drive coils to generate driving magnetic fluxes therein. More particularly, one of the pair of Hall effect elements is disposed near one of the pair of drive coils so that said one Hall effect element detects the polarity of the magnetic flux which links to said one drive coil and the output signal from said one Hall effect element is supplied to said one drive coil, while the other Hall effect element is disposed near the other drive coil so that said other Hall effect element detects the polarity of the magnetic flux which links to said other drive coil and the output signal from said other Hall effect element is supplied to said other drive coil, whereby driving magnetic fluxes are generated in the respective drive coils.

In this motor, the polarities of the magnetic fluxes which link to the pair of drive coils are detected by the pair of Hall effect elements and the output signals therefrom are amplified and then supplied to the respective drive coils. Accordingly, the characteristics of the pair of Hall effect elements must be identical to each other. If the characteristics of the pair of Hall effect elements are unbalanced resulting in a difference between the output signals, there occurs a difference between driving torques generated in the pair of drive coils resulting in non-uniform rotation of the motor and vibration.

It is, however, difficult to obtain a pair of Hall effect elements of balanced characteristic. In the past, therefore, the currents supplied to the respective Hall effect elements have been controlled or the gains of the amplifiers for amplifying the output signals of the Hall effect elements have been adjusted to equalize the magnitudes of the driving torques generated in the pair of drive coils. The Hall effect element has a pair of current supply terminals and a pair of output voltage terminals. One of the pair of current supplying terminals is a common electrode to the pair of output voltage terminals and output voltages are developed between one of the pair of output voltage terminals and the common electrode and between the other output voltage terminal and the common electrode, respectively. A differential voltage between those two output voltages is referred to as an unbalance voltage. The unbalance voltage changes in proportion to the currents supplied to the pair of current supply terminals. Accordingly, it is not desirable to control the currents supplied to the Hall effect elements to adjust the driving torques because the unbalance voltage of each of the Hall effect elements is changed thereby. When the gains of the amplifiers are adjusted, gain control circuits must be included in the amplifiers. This leads to the increase of the cost of the amplifiers. In addition, it is difficult to establish optimum gain.

SUMMARY OF THE INVENTION

It is an object of the present invention to provide a motor using Hall effect elements which allows easy adjustment of output voltages of the Hall effect elements.

In the motor according to the present invention, a disk-shaped multi-pole magnet is attached to a rotary shaft, which magnet is circumferentially divided into a plurality of magnetic poles each magnetized in the direction of thickness thereof in an opposite polarity to its adjacent magnetic poles. The rotary shaft is rotatably mounted on a yoke plate which is spaced from and disposed to face the disk-shaped magnet to define an air gap between the disk-shaped magnet and the yoke plate. There are disposed within the air gap a pair of drive coils which are angularly displaced from each other by an electrical angle of 90°, each drive coil being a star shape coil having about 60 turns of copper wire. A Hall effect element is disposed near each of the pair of drive coils. The pair of Hall effect elements and the pair of drive coils link to magnetic fluxes of the disk-shaped magnet, and an output signal from one of the pair of Hall effect elements is amplified and then supplied to one of the pair of drive coils while an output signal from the other Hall effect element is amplified and then supplied to the other drive coil. Pole pieces made of magnetic material are disposed on the yoke plate at the positions corresponding to the pair of Hall effect elements. The pole pieces extend from the top surface of the yoke plate to the respective Hall effect elements to define air gaps between the respective Hall effect elements and the respective pole pieces. The magnetic fluxes of the disk-shaped magnet are applied to the pair of Hall effect elements through the respective pole pieces. The air gaps defined between the respective Hall effect elements and the respective pole pieces can be adjusted by moving the respective pole pieces upward or downward to change the magnetic flux densities of the disk-shaped magnet applied to the Hall effect elements to equalize the output voltages of the Hall effect elements.

According to the motor of the present invention, since the output voltages of the Hall effect elements are adjusted by controlling the magnetic flux densities of the magnetic fluxes applied to the Hall effect elements, the unbalance voltages of the Hall effect elements are not changed and the ununiform rotation and the vibration of the motor can be minimized.

DESCRIPTION OF THE PREFERRED EMBODIMENT

Figure 1:
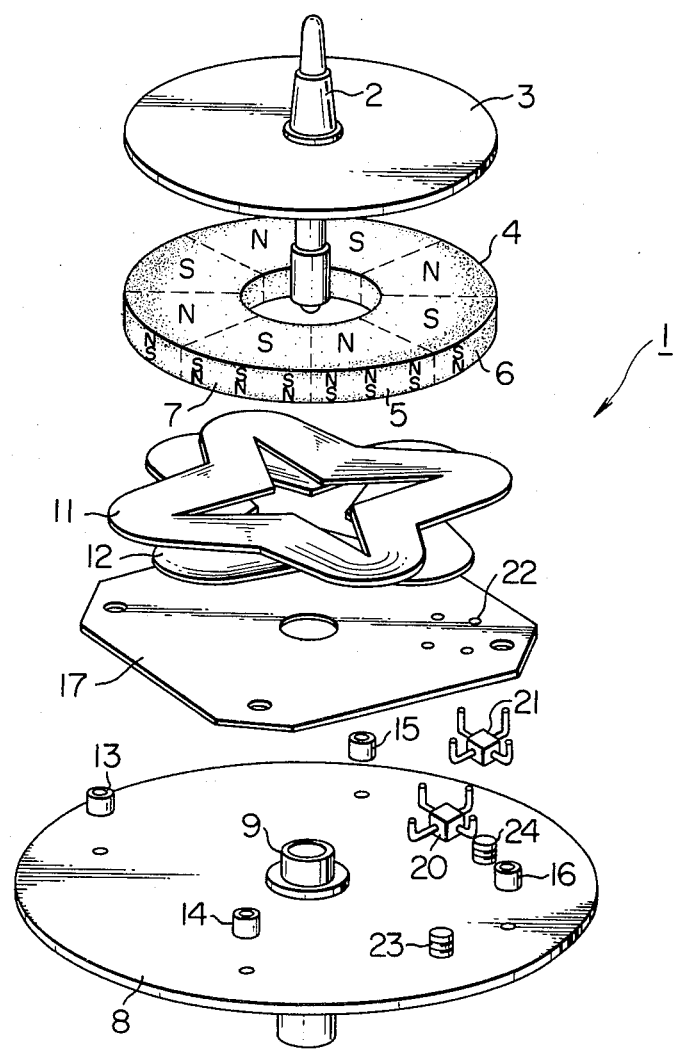
FIG. 1 is a perspective exploded view of a motor in accordance with the present invention.
Figure 2:
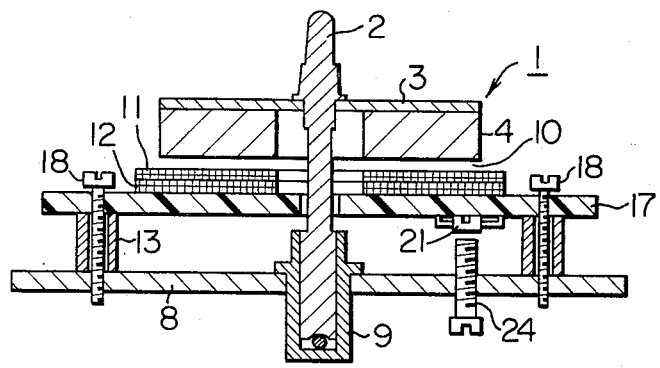
FIG. 2 is a sectional view of the motor of the present invention.

FIG. 1 is a perspective exploded view of one embodiment of the motor of the present invention and FIG. 2 is a sectional view thereof. In those figures, a disk-shaped rotor plate 3 made of a magnetic material is attached to a rotary shaft 2 of a motor 1 and the rotary shaft 2 is pressed into a bore formed at the center of the rotor plate 3 so that it is coupled to the rotor plate 3, a disk-shaped magnet 4 is bonded to a lower surface of the rotor plate 3 by adhesive material. The magnet 4 is a ferrite magnet and it is circumferentially divided into eight magnetic poles which are magnetized in the direction of thickness. Each of the magnetic poles is magnetized in an opposite polarity to its adjacent magnetic poles. For example, if a magnetic pole 5 is magnetized with an upper surface thereof being an N-pole and a lower surface thereof being an S-pole, magnetic poles 6 and 7 on the right side and the left side of the magnetic pole 5, respectively, are magnetized with the upper surfaces thereof being S-poles and the lower surfaces thereof being N-poles. The rotary shaft 2 is inserted into a bearing 9 which is mounted at the center of the disk-shaped yoke plate 8, and the rotary shaft 2 is rotatably supported by the bearing 9. The yoke plate 8 is made of a magnetic material and spaced from and disposed to face the lower surface of the magnet 4 when the rotary shaft 2 is inserted in the bearing 9, defining a magnetic air gap 10 between the yoke plate 8 and the magnet 4. First and second drive coils 11 and 12 of star-shape are disposed within the air gap 10. Each of the drive coils 11 and 12 is formed by winding about 60 turns of copper wire in a square shape and bending each of the four sides of the resulting square coil inward at the center of the respective sides to form the star-shape coil. The pair of drive coils 11 and 12 are angularly displaced from each other by an electrical angle of 90° and by a physical angle of 22.5°. There are disposed on the upper surface of the yoke plate 8 four washers 13, 14, 15 and 16, on which an insulating base plate 17 made of synthetic resin is mounted with the base plate 17 and the washers 13, 14, 15 and 16 which are fixed to the yoke plates 8 by bolts 18 which extend from the upper surface of the base plate 17 to the lower plate of the yoke plate 8. The drive coils 11 and 12 are fixed to the upper surface of the base plate 17 by adhesive material. There are mounted on the lower surface of the base plate 17 a pair of Hall effect elements 20 and 21 which are disposed near the drive coils 11 and 12, respectively. More particularly, the first Hall effect element 20 is disposed near one of four projections of the first drive coil 11, and the second Hall effect element 21 is disposed near one of the projections of the second drive coil 12. The pair of Hall effect elements 20 and 21 are disposed within the magnetic field of the magnet 4 near the outer periphery thereof and angularly displaced from each other by an electrical angle of 90°. Terminals of the pair of Hall effect elements are inserted into terminal holes formed in the base plate 17 to mount the respective Hall effect elements on the base plate 17. There is formed between the base plate 17 and the yoke plate 8 a gap the length of which corresponds to the length of the respective washers 13, 14, 15 and 16, and the pair of Hall effect elements 20 and 21 are disposed within this gap. A pair of pole pieces 23 and 24 made of magnetic material are attached to the yoke plate 8, with one pole piece 23 being disposed immediately below the first Hall effect element 20 while the other pole piece 24 being disposed immediately below the second Hall effect element 21. The pole pieces 23 and 24 are magnetically coupled to the yoke plate 8 and are axially movable upward and downward between the yoke plate 8 and the Hall effect elements 20 and 21, respectively. The pole pieces 23 and 24 may be bolts made of iron. The yoke plate 8 is formed with threaded bores in which the bolts are screwed so that the bolts are axially moved upward and downward by turning the bolts. The magnetic fluxes of the magnet 4 are applied to the Hall effect elements 20 and 21 through the pole pieces 23 and 24. By moving the pole pieces 23 and 24 upward or downward to change the spacings between the pole pieces 23 and 24 and the Hall effect elements 20 and 21, respectively, the magnetic flux densities supplied to the Hall effect elements 20 and 21 can be changed.

Figure 3:
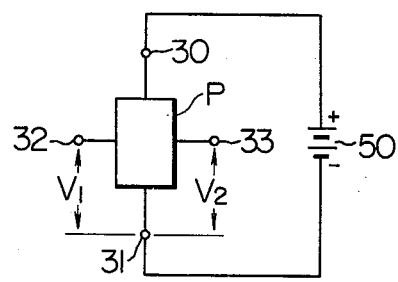
FIG. 3 is a schematic diagram of a Hall effect element for illustrating a relation between an input current and an output voltage of the Hall effect element.
Figure 4:
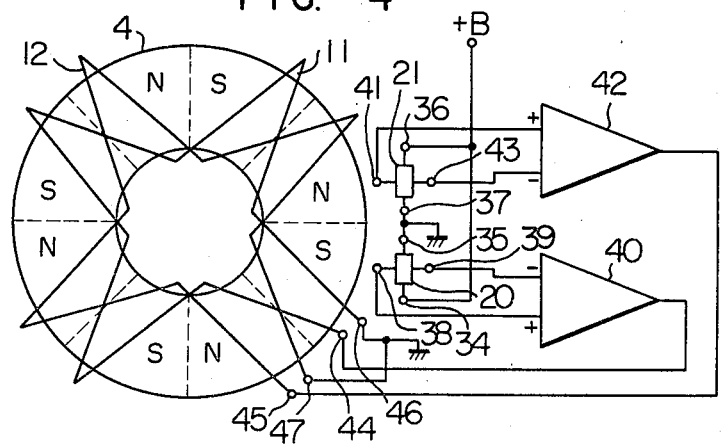
FIG. 4 is a circuit diagram of the motor of the present invention.

As shown in FIG. 2, the motor 1 has an axial spacing between the pair of drive coils 11 and 12 and the opposing magnet 4. The pair of drive coils 11 and 12 are angularly displaced from each other by an electrical angle of 90°, with the first Hall effect element 20 being disposed near one of the projections of the first drive coil 11 thereby to detect the polarity of the magnetic pole of the magnet 4 which links to the first drive coil 11 while the second Hall effect element 21 being disposed near one of the projections of the second drive coil 12 thereby to detect the polarity of the magnetic pole which links to the second drive coil 12. The first and second Hall effect elements 20 and 21 are angluarly displaced from each other by the electrical angle of 90°. As shown in FIG. 3, each of the Hall effect elements 20 and 21 has a pair of current supply terminals 30 and 31 and a pair of output voltage terminals 32 and 33. As shown in FIG. 4, one current supply terminal 34 of the first Hall effect element 20 is connected to a positive terminal of a D.C. power supply designated by +B, and the other current supply terminal 35 is directly grounded. One current supply terminal 36 of the second Hall effect element 21 is connected to the D.C. power supply and the other current supply terminal 37 is grounded. One output voltage terminal 38 of the first Hall effect element 20 is connected to a positive input terminal of a first power amplifier 40 while the other output voltage terminal 39 is connected to a negative input terminal of the amplifier 40. One output voltage terminal 41 of the second Hall effect element 21 is connected to a positive input terminal of a second power amplifier 42 while the other output voltage terminal 43 is connected to a negative input terminal of the amplifier 42. An output terminal of the amplifier 40 is connected to one input terminal 44 of the first drive coil 11 while an output terminal of the amplifier 42 is connected to one input terminal 45 of the second drive coil 12. The other input terminal 46 of the first drive coil 11 and the other input terminal 47 of the second drive coil 12 are interconnected and directly grounded.

Since the Hall effect elements 20 and 21 are supplied with the currents from the D.C. power supply and they link to the magnetic fluxes of the magnet 4, positive or negative voltages are developed across the output voltage terminals 38 and 39 and the output voltage terminals 41 and 43, respectively, depending or the polarities of the linking magnetic poles. The output voltage of the Hall effect element 20 is amplified by the amplifier 40 while the output voltage of the Hall effect element 21 is amplified by the amplifier 42. An output current from the amplifier 40 is supplied to the first drive coil 11 to generate a driving torque therein while an output current from the amplifier 42 is supplied to the second drive coil 12 to generate a driving torque therein.

In the motor of the construction described above, when a current $i_A$ is supplied to the first drive coil 11, a torque $T_A$ shown below is generated in the first drive coil 11;

$$T_A = K_T i_A \cos 4\theta \quad (1)$$

where $K_T$ is a constant relating to a torque and $\theta$ is a rotational angle. When a current $i_B$ is supplied to the second drive coil 12, a torque $T_B$ shown below is generated in the drive coil 12;

$$T_B = K_T \cdot i_B \sin 4\theta \quad (2)$$

Since the Hall effect elements 20 and 21 are disposed near the outer periphery of the magnet 4, the magnetic flux densities of the magnetic fluxes applied to the Hall effect elements 20 and 21 as the magnet 4 rotates change sinusoidally. As a result, the voltages developed across the output voltage terminals 38 and 39 and across the output voltage terminals 41 and 43 of the Hall effect elements 20 and 21, respectively, are sinusodial, and those output voltages are amplified by the amplifiers 40 and 42, respectively and then supplied to the first and second drive coils 11 and 12, respectively. Thus, the drive current $i_A$ supplied to the first drive coil 11 and the drive current $i_B$ supplied to the second drive coil 12 are expressed by;

$$i_A = I_A \cos 4\theta \quad (3)$$

$$i_B = I_B \sin 4\theta \quad (4)$$

Thus, the driving torque $T_A$ generated in the first drive coil 11 and the driving torque $T_B$ generated in the second drive coil 12 are given by;

$$T_A = K_T I_A \cos^2 4\theta \quad (5)$$

$$T_B = K_T I_B \sin^2 4\theta \quad (6)$$

accordingly, the magent 4 is rotated.

As shown in FIG. 3, when a D.C. power supply 50 is connected between the pair of current supply terminals 30 and 31 of the Hall effect element P to supply a D.C. current $I_C$ thereto and a magnetic flux is applied in the direction normal to the plane of the drawing, an output voltage $V_H$ is developed between the pair of output voltage terminals 32 and 33. The relation among the output voltage $V_H$, the current $I_C$ and the magnetic flux density B is given by;

$$V_H = K \cdot I_C \cdot B \quad (7)$$

where K is a constant which is referred to as a product sensitivity. When the magnetic flux supplied to the Hall effect element P is removed, that is, when B=0, a D.C. voltage $V_1$ is developed between one output terminal 32 and the current supply terminal 31, and a D.C. voltage $V_2$ is developed between the other output terminal 33 and the current supply terminal 31. A differential voltage $V_o$ between the voltage $V_1$ and the voltage $V_2$ is given by;

$$V_o = V_1 - V_2 \quad (8)$$

$$V_o = K_o \cdot I_C \quad (9)$$

where $V_o$ is referred to as an unbalance voltage and $K_o$ is a constant. The unbalance voltage $V_o$ changes in proportion to the current. When more than one Hall effect element are used, the output voltages $V_H$ of the respective Hall effect elements differ from each other due to the difference of the product sensitivity K of each Hall effect element. Accordingly, the currents $I_C$ to be supplied to the respective Hall effect elements are adjusted to equalize the output voltages $V_H$ of the respective Hall effect elements. However, when the currents $I_C$ are changed, the unbalance voltages $V_o$ change proportionally.

In the motor shown in FIG. 4, when the unbalance voltages are developed in the Hall effect elements 20 and 21, respectively, the drive currents $i_A$ and $i_B$ shown by the equations (3) and (4) are expressed by;

$$i_A = I_A \cos 4\theta + I_o A \quad (10)$$

$$i_B = I_B \sin 4\theta + I_o B \quad (11)$$

where $I_A$ and $I_B$ are constants which are proportional to the output voltages of the Hall effect elements 20 and 21, respectively, and $I_o A$ and $I_o B$ are constants which are proportional to the unbalance voltages of the Hall effect elements 20 and 21, respectively. When $I_B$ is given by;

$$I_B = (1 + \alpha) I_A \quad (12)$$

a torque T of the motor shown in FIG. 4 is expressed by;

$$T = K_T (I_A + \alpha I_A \sin^2 4\theta + I_{oA} \cos 4\theta + I_{oB} \sin 4\theta) \quad (13)$$

$$T = K_T \left( I_A (1 + \tfrac{1}{2}\alpha) - \tfrac{1}{2}\alpha I_A \cos 8\theta \right.$$
$$\left. + \sqrt{I_{oA}^2 + I_{oB}^2} \sin(4\theta + \beta) \right) \quad (14)$$

where $\beta = \tan^{-1}(I_{oA}/I_{oB})$. When $\alpha \neq 0$, the torque of the motor changes eight times per revolution, and when $I_{oA} \neq 0$ and $I_{oB} 6\ 0$, the torque changes from times per revolution, and when $\alpha=0$ and $I_{oA}=I_{oB}=0$, the torque is given by;

$$T=K_T I_A \tag{15}$$

and the torque does not change during each revolution.

The output voltages of the pair of Hall effect elements 20 and 21 of the motor 1 shown in FIGS. 1 and 2 can be adjusted by the pole pieces 23 and 24, respectively. The rotary shaft 2, the rotor plate 3, the magnet 4 and the yoke plate 8 constitute a magnetic circuit, and the magnetic fluxes of the magnet 4 are applied to the pair of Hall effect elements 20 and 21 through the magnetic circuit and the pole pieces 23 and 24 when the pole pieces 23 and 24 are inserted in the air gap 10 defined by the magnet 4 and the yoke plate 8, the magnetic fluxes near the pole pieces 23 and 24 are concentrated to the pole pieces 23 and 24 and pass through the centers of the pole pieces 23 and 24. As a result, the densities of the magnetic fluxes applied to the Hall effect elements 20 and 21 increase. The magnetic flux densities can be changed by changing the spacings between the upper ends of the pole pieces 23 and 24, respectively, and the Hall effect elements 20 and 21, respectively. Since the pole pieces 23 and 24 are axially moved when they are turned, it is possible to finely adjust the spacings between the pole pieces 23 and 24 and the Hall effect elements 20 and 21, respectively. In this manner, the magnetic flux densities applied to the pair of Hall effect elements 20 and 21 are changed to equalize the output voltages of the Hall effect elements 20 and 21. Accordingly, the currents supplied to the Hall effect elements 20 and 21 do not change and hence the unbalance voltages of the Hall effect elements 20 and 21 do not change. Furthermore, since the magnetic fluxes are applied to the Hall effect elements 20 and 21 through the pole pieces 23 and 24, the densities of the magnetic fluxes increase. Accordingly, large output voltages can be produced by the Hall effect elements 20 and 21 with smaller currents supplied thereto. By reducing the currents, the unbalance voltages of the Hall effect elements 20 and 21 are reduced so that the non-uniform rotation and the vibration of the motor are minimized.

It is not always necessary to use two pole pieces 23 and 24 but one pole piece may be arranged for one of the pair of Hall effect elements 20 and 21 to adjust the output voltage of one Hall effect element to be equal to the output voltage of the other Hall effect element.

We claim:

1. A motor using Hall effect elements, comprising:
   a disk-shaped multi-pole magnet coupled to a rotary shaft and circumferentially divided into a plurality of magnetic poles each magnetized in the direction of thickness thereof in an opposite polarity to its adjacent magnetic poles;
   a yoke plate for rotatably supporting said rotary shaft, said yoke plate being disposed to face said multi-pole magnet to define an air gap therebetween;
   a pair of drive coils disposed within said air gap and angularly displaced from each other by an electrical angle of 90°, said pair of drive coils linking to a magnetic flux of said multi-pole magnet;
   a pair of Hall effect elements spaced from said yoke plate and disposed within said air gap, said pair of Hall effect elements linking to the magnetic flux of said multi-pole magnet;
   said pair of Hall effect elements being angularly displaced from each other by an electrical angle of 90° for developing output voltages thereacross in the polarities determined by the polarities of the magnetic poles of said multi-pole magnet;
   means for supplying said output voltages of said pair of Hall effect elements to said pair of drive coils, respectively; and
   a pair of pole pieces disposed to face said pair of Hall effect elements, respectively, and magnetically coupled to said yoke plate for adjusting magnetic flux densities of said multi-pole magnet applied to said pair of Hall effect elements.

2. A motor accoring to claim 1, wherein said pair of pole pieces each comprises a bolt made of magnetic material.

3. A motor according to claim 1, wherein said pair of pole pieces are coupled to said yoke plate in such a manner as to allow their axial movement so that spacings between the respective pole pieces and the respective Hall effect elements can be adjusted.

4. A motor using Hall effect elements, comprising:
   a disk-shaped magnet coupled to a rotary shaft and circumferentially divided into a plurality of magnetic poles each magnetized in an opposite polarity to its adjacent magnetic poles;
   a yoke plate for rotatably supporting said rotary shaft, said yoke plate being disposed to face said disk-shaped magnet to define an air gap therebetween;
   a pair of drive coils disposed within said air gap and angularly displaced from each other by an electrical angle of 9020 said pair of drive coils linking to a magnetic flux of said disk-shaped magnet;
   a pair of Hall effect elements disposed within said air gap and angularly displaced from each other by an electrical angle of 90°, said pair of Hall effect elements having a pair of current supply terminals to which the same amount of d.c. current is supplied respectively and a pair of output voltage terminals, said pair of Hall effect elements linking to the magnetic flux of said disk-shaped magnet to develop output voltages thereacross at the respective pair of output voltage terminals in the polarities determined by the polarities of the magnetic poles of said disk-shaped magnet;
   means for supplying said output voltages of said pair of Hall effect elements to said pair of drive coils, respectively; and
   a pole piece arranged with an adjustable distance to oppose to at least one of said pair of Hall elements and magnetically coupled to said yoke plate to supply the magnetic flux of said disk-shaped magnet to said at least one of said pair of Hall elements through the pole piece.

5. A motor using Hall effect elements, comprising:
   a disk-shaped multi-pole magnet coupled to a rotary shaft and circumferentially divided into a pluarlity of magnetic poles each magnetized in an opposite polarity to its adjacent magnetic poles;
   a yoke plate for rotatably supporting said rotary shaft, said yoke plate being disposed to face said multi-pole magnet to define an air gap therebetween;
   a pair of drive coils disposed within said air gap and angularly displaced from each other by an electrical angle of 90°;
   a pair of Hall effect elements disposed within said air gap and angularly displaced from each other by an electrical angle of 90°, said pair of Hall effect elements having a pair of current supply terminals to which the same amount of d.c. current is supplied and a pair of output voltage terminals, respectively, said pair of Hall effect elements linking to the magnetic flux of said disk-shaped magnet to develop output voltage thereacross at the respective pair of output voltage terminals in the polarities determined by the polarities of the magnetic poles of said disk-shaped magnet;

means for supplying said output voltages of said pair of Hall effect elements to said pair of drive coils, respectively; and pole piece means for adjusting the magnetic flux supplied to at least one of said pair of Hall elements so that the respective output voltages of said pair of Hall elements are a voltage of the same amplitude.

6. A motor using Hall effect elements according to claim 5, wherein said pole piece means includes at least one pole piece opposed to said at least one of said pair of Hall effect elements and arranged for adjusting the distance from said at least one of said pair of Hall effect elements so as to adjust the magnetic flux supplied thereto and to adjust the output voltage thereof, said at least one pole piece being attached to said yoke plate.

7. A motor using Hall effect elements according to claim 6, wherein said pole piece means includes a pair of pole pieces opposed with an adjustable distance to said pair of Hall effect elements and attached to said yoke plate for adjusting the magnetic flux applied to said pair of Hall effect elements and the output voltage thereof.

8. A motor using Hall effect elements according to claim 7, wherein said pair of pole pieces each comprises a bolt made of magnetic material.

9. A motor using Hall effect elements according to claim 7, further comprising an insulating substrate disposed in the air gap with a certain distance from said yoke plate, said pair of drive coils being attached to said insulating substrate and said pair of Hall effect elements being attached to said insulating substrate and opposed with a certain distance to said yoke plate.

10. A motor using Hall effect elements according to claim 9, wherein each magnetic pole of said disk-shaped magnet is magnetized in the direction of thickness thereof and said yoke plate is a plate-shaped yoke plate.

* * * * *